US009026738B2

(12) United States Patent
Kato

(10) Patent No.: US 9,026,738 B2
(45) Date of Patent: May 5, 2015

(54) CACHE MEMORY DEVICE, CACHE MEMORY CONTROL METHOD, PROGRAM AND INTEGRATED CIRCUIT

(75) Inventor: Kazuomi Kato, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 876 days.

(21) Appl. No.: 12/997,093

(22) PCT Filed: Apr. 7, 2010

(86) PCT No.: PCT/JP2010/002551
§ 371 (c)(1),
(2), (4) Date: Dec. 21, 2011

(87) PCT Pub. No.: WO2010/116735
PCT Pub. Date: Oct. 14, 2010

(65) Prior Publication Data
US 2012/0096213 A1    Apr. 19, 2012

(30) Foreign Application Priority Data
Apr. 10, 2009  (JP) ................. 2009-095808

(51) Int. Cl.
*G06F 12/00* (2006.01)
*G06F 13/00* (2006.01)
*G06F 12/08* (2006.01)
*G06F 12/12* (2006.01)

(52) U.S. Cl.
CPC ........ *G06F 12/0862* (2013.01); *G06F 12/0895* (2013.01); *G06F 12/126* (2013.01); *G06F 2212/6046* (2013.01)

(58) Field of Classification Search
None
See application file for complete search history.

(56) References Cited

U.S. PATENT DOCUMENTS

| 6,349,364 | B1 | 2/2002 | Kai et al. |
| 6,393,521 | B1 | 5/2002 | Fujii |
| 7,359,890 | B1* | 4/2008 | Ku et al. ................. 1/1 |
| 7,539,823 | B2 | 5/2009 | Kakeda |
| 2001/0013093 | A1* | 8/2001 | Banno et al. .............. 712/210 |
| 2002/0032827 | A1* | 3/2002 | Nguyen et al. ............ 711/3 |
| 2003/0007442 | A1* | 1/2003 | Henrichs ................... 369/95 |
| 2003/0161245 | A1* | 8/2003 | Henrichs ................... 369/95 |

(Continued)

FOREIGN PATENT DOCUMENTS

| JP | 2002-149488 | 5/2002 |
| JP | 3515333 | 1/2004 |

(Continued)

OTHER PUBLICATIONS

International Search Report issued Jul. 6, 2010 in International (PCT) Application No. PCT/JP2010/002551.

*Primary Examiner* — Sean D Rossiter
(74) *Attorney, Agent, or Firm* — Wenderoth, Lind & Ponack, L.L.P.

(57) ABSTRACT

To aim to provide a cache memory device that performs a line size determination process for determining a refill size, in advance of a refill process that is performed at cache miss time. According to the line size determination process, the number of reads/writes of a management target line that belongs to a set is acquired (S51), and in the case where the numbers of reads completely match one another and the numbers of writes completely match one another (S52: Yes), the refill size is determined to be large (S54). Otherwise (S52: No), the refill size is determined to be small (S55).

10 Claims, 10 Drawing Sheets

(56) References Cited

U.S. PATENT DOCUMENTS

| | | |
|---|---|---|
| 2006/0059317 A1 | 3/2006 | Kakeda |
| 2006/0190686 A1 | 8/2006 | Tsuboi |
| 2008/0229027 A1* | 9/2008 | Shioya et al. ................ 711/137 |
| 2014/0052927 A1* | 2/2014 | McCauley et al. ............ 711/137 |

FOREIGN PATENT DOCUMENTS

| | | |
|---|---|---|
| JP | 2004-259109 | 9/2004 |
| JP | 2006-85292 | 3/2006 |
| JP | 4071886 | 1/2008 |
| JP | 4189402 | 9/2008 |

* cited by examiner

FIG.4

| | 207a | 207b | 207c |
|---|---|---|---|
| | Index | Tag | Cache data |
| | 0x000 | 0x01c80 | 0x00001000 |
| | 0x001 | 0x01c80 | 0x00000000 |
| | 0x002 | 0x10000 | 0x00000000 |
| | 0x003 | 0x00040 | 0x40000000 |
| | . . . | . . . | . . . |
| | 0x140 | 0x04000 | 0x00000000 |
| | . . . | . . . | . . . |
| | 0x200 | 0x02000 | 0x00000020 |
| | 0x201 | 0x02000 | 0x00000040 |
| | 0x202 | 0x02000 | 0x00000060 |
| | 0x203 | 0x02000 | 0x00000080 |
| | . . . | . . . | . . . |
| | 0x280 | 0x08000 | 0x00010000 |
| | . . . | . . . | . . . |
| | 0x3FF | 0x06000 | 0x10000000 |

207
Cache data storage

CACHE MEMORY DEVICE, CACHE MEMORY CONTROL METHOD, PROGRAM AND INTEGRATED CIRCUIT

TECHNICAL FIELD

The present invention relates to a technology for refilling data in a cache memory.

BACKGROUND ART

A cache memory is a storage device that is disposed between a processor and a main memory. The cache memory is smaller in capacity than the main memory, but can access a CPU at a high speed.

If data requested by the processor is present in the cache memory, this is called "hit", and if the data requested by the processor is not present in the cache memory, this is called "miss". In the case of the miss, a process called "refill" is performed so as to replace data in the cache memory.

Generally, in the field of memories, spatial locality (locality principle stating that if an item is referenced, nearby items will tend to be referenced soon) is known. If a size of data that is to be refilled (hereinafter, referred to as "refill size") is increased to some extent, a hit rate can be increased.

Nevertheless, capacity of the cache memory is limited. Therefore, if the refill size is too large, even the data requested by the processor might be replaced, and accordingly the hit rate might be decreased (miss rate might be increased). Such a situation is likely to occur especially when a program does not immediately use data that follows data that has caused the miss.

Regarding optimization of the refill size, a technology disclosed in Patent Literature 1 is known.

CITATION LIST

Patent Literature

[Patent Literature 1]
   Japanese Patent Application Publication No. 2004-259109

SUMMARY OF INVENTION

Technical Problem

The cache memory tends to be used by various programs that operate in parallel with one another. Therefore, even if an item in the cache memory is referenced by a program, it is difficult to estimate whether a nearby item is subsequently referenced. If the refill size is set to be large due to misestimation, most of refilled data is not used and accordingly process delay is caused.

The present invention has been achieved in view of the above background, and an aim thereof is to provide a cache memory device that can contribute to controlling the refill size so as to be set to an appropriate size for utilizing the spatial locality, in accordance with an operation of a program.

Solution to Problem

The present invention provides a cache memory device comprising: a storage unit operable to store cache data therein; an address extraction unit operable, on receipt of an access request that includes specification of an address, to extract a tag and an index from the address; a hit/miss judgment unit operable to judge, with respect to the cache data, a hit or a miss based on the tag and the index extracted by the address extraction unit; a management unit operable to manage, regarding a plurality of line sets that each consist of a plurality of lines whose indexes are sequential, a number of accesses to each line; a count unit operable, when the index extracted by the address extraction unit indicates an index corresponding to one of the plurality of lines and the hit/miss judgment unit judges a hit relating to the extracted index, to increment by one the number of accesses to the line corresponding to the extracted index; an identification unit operable, when the extracted index does not indicate an index corresponding to one of the plurality of lines and the hit/miss judgment unit judges a miss relating to the extracted index, to identify a line set including the line represented by the extracted index among the plurality of lines; a determination unit operable, when the numbers of accesses to all the lines that constitute the line set identified by the identification unit do not match one another, to determine a refill size as a first refill size, the refill size being a size of cache data that is to be refilled, or when the numbers of accesses to all the lines that constitute the identified line set completely match one another, to determine the refill size as a second refill size that is larger than the first refill size; and a refill unit operable to refill the cache data based on the refill size determined by the determination unit.

Advantageous Effects of Invention

If the numbers of accesses completely match one another, it can be presumed that a program locally references a memory. According to the cache memory device of the present invention, under the condition that the numbers of accesses completely match one another, the hit rate can be increased by increasing the refill size, and accordingly data transmission related to the cache memory can be reduced. As a result, an operation performance of the program can be improved.

BRIEF DESCRIPTION OF DRAWINGS

FIG. 4 shows an example of cache data managed by a cache data storage unit.

DESCRIPTION OF EMBODIMENT

Figure 1:
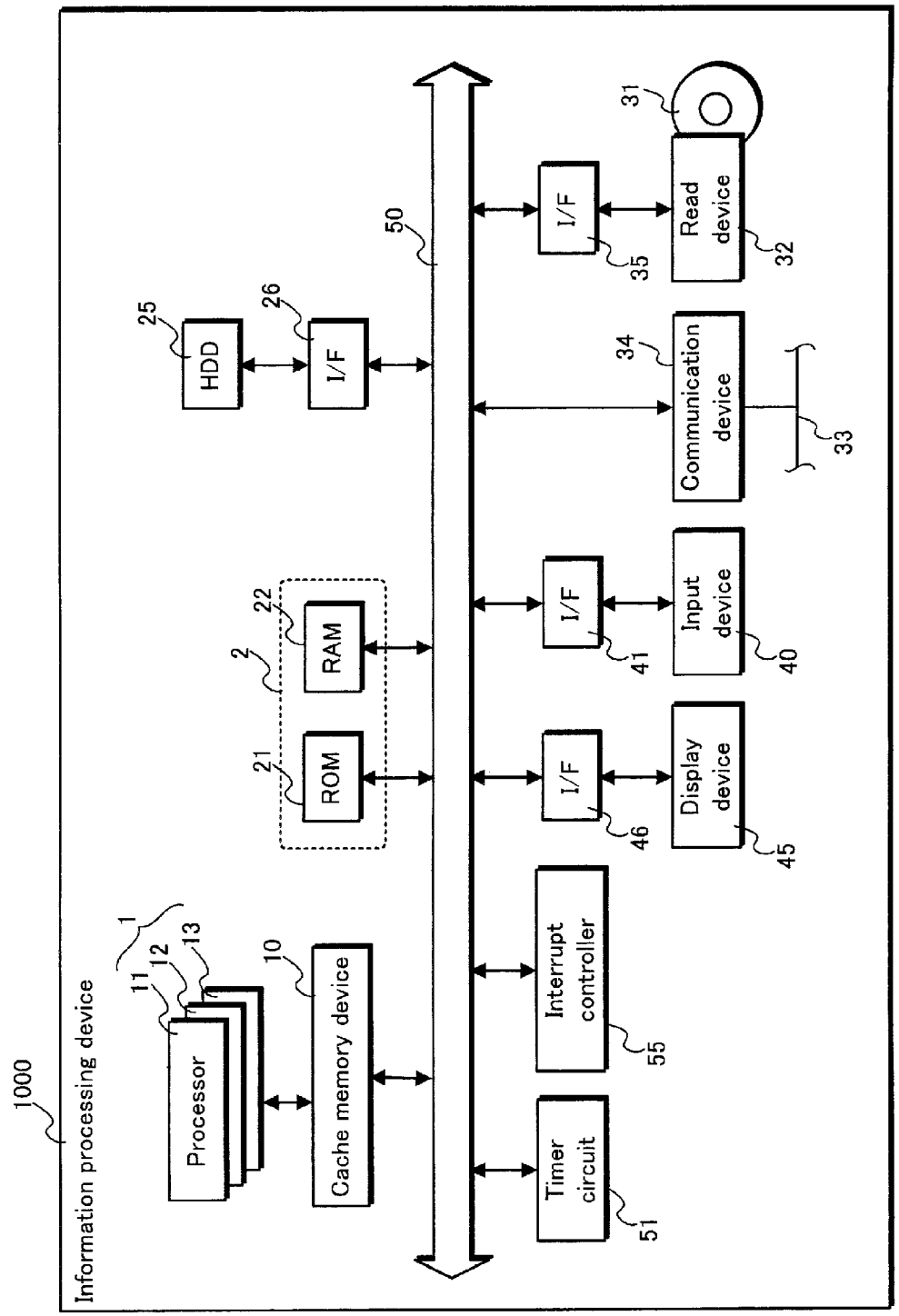
FIG. 1 shows a configuration of an information processing device that includes a cache memory device.

Hereinafter, an embodiment of the present invention is described with reference to the drawings.
<Configuration>
   FIG. 1 shows a configuration of an information processing device 1000 that includes a cache memory device.

The information processing device 1000 is, for example, comprised of a general purpose computer such as a PC (personal computer).

The information processing device 1000 includes a processor 1, a memory device 2, a communication device 34, an input device 40, a display device 45, a timer circuit 51, and an interrupt controller 55. These devices are connected to one another via a bus line 50.

Also, to the bus line 50, an HDD (Hard Disk Drive) 25, a read device 32, the input device 40 and the display device 45 are connected via I/Fs (interfaces) 26, 35 41 and 46, respectively.

The processor 1 is composed of three processors 11, 12 and 13. Each processor is called CPU (Central Processing Unit).

The memory device 2 includes a ROM (Read Only Memory) 21 and a RAM (Random Access Memory) 22.

The ROM 21 stores therein computer programs and data that define operations of the processor 1, and is composed of a nonvolatile memory such as a flash ROM. Such a memory is writable, and capable of holding stored contents even when the power is off. The RAM 22 temporally stores therein data that is generated in accordance with a process performed by the processor 1, and is composed of a volatile memory incapable of holding stored contents when the power is off. Besides, the computer programs and the data can be stored in the HDD 25, instead of the ROM 21.

The processor 1 performs a process defined by the computer programs, as writing the computer programs and the data that are stored in the ROM 21 and the HDD 25 into the RAM 22, if needed.

The HDD 25 stores therein computer programs and data.

The read device 32 reads computer programs and data stored in a storage medium (for example, a CD, a DVD, a memory card or the like) 31.

The communication device 34 communicates computer programs and data with an external device via a communication line 33 such as a phone line, a network line, wireless communication, and infrared communication.

The input device 40 inputs data or the like according to a user operation, and is composed of a keyboard, a mouse, and various input buttons.

The display device 45 displays data, images or the like on a screen, and outputs data or the like with sound. The display device 45 is composed of, for example, a 19-inch LCD (Liquid Crystal Display) and a speaker.

The timer circuit 51 outputs a timer interrupt signal at a constant period.

The interrupt controller 55 relays, to the processor 1, an interrupt request signal transmitted by the timer circuit 55, the input device 40, the processor 1, the communication device 34 that is a network device, the HDD 25, the read device 32 or the like. Priority is determined for each interrupt request signal transmitted from each device. The interrupt controller 55 has a function for arbitrating those requests based on the priority, in the case where a plurality of devices transmit the interrupt request signals at the same time.

Figure 2:
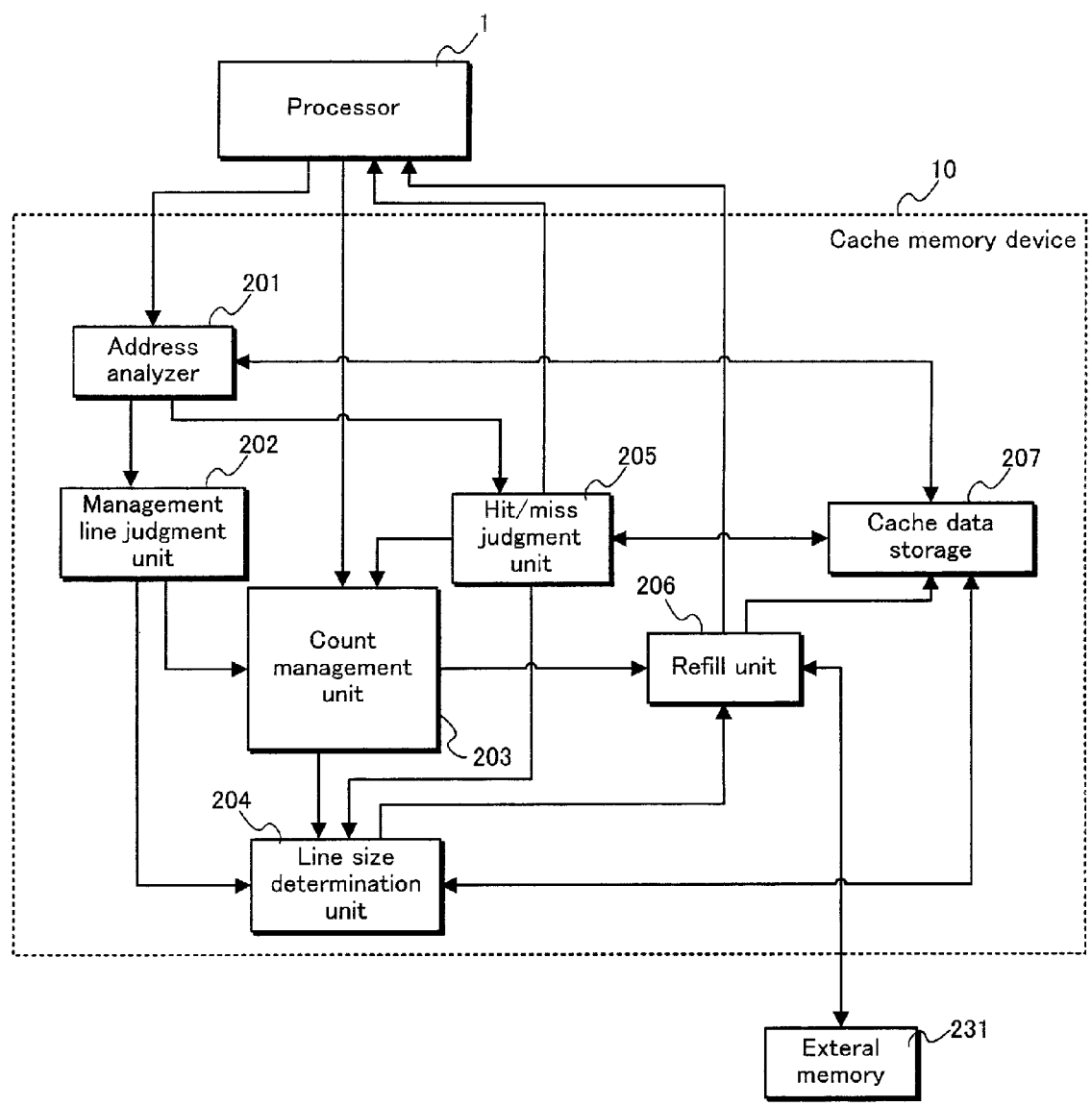
FIG. 2 is a block diagram showing a configuration of the cache memory device.

FIG. 2 is a block diagram showing a configuration of a cache memory device 10. The cache memory device 10 operates in collaboration with the processor 1 and an external memory 231. As the external memory 231, the RAM 22 included in the memory device 2 shown in the FIG. 1 is typically used.

The cache memory device 10 includes an address analyzing unit 201, a management line judgment unit 202, a count management unit 203, a line size determination unit 204, a hit/miss judgment unit 205, a refill unit 206 and a cache data storage unit 207. Besides, cache data is managed in units of fixed-sized data called cache line (hereinafter, referred simply to as "line"). In addition, each line of the cache data can be accessed by being uniquely identified relating to an index.

The address analyzing unit 201 receives, from the processor 1, an address that shows a storage unit destination of required data. The address analyzing unit 201 extracts from the received address, a tag for judging a hit or a miss and an index showing a storage unit offset of the cache data. The address analyzing unit 201 passes the extracted index to the management line judgment unit 202, and the tag and the index to the hit/miss judgment unit 205.

The management line judgment unit 202 judges whether an access to the data required by the processor 1 is an access to a management target line that is to be managed by the count management unit 203 (as described later, the count management unit 203 manages predetermined part of all the lines in the cache memory).

The management line judgment unit 202 holds therein an index that corresponds to the management target line. When receiving of an index from the address analyzing unit 201, the management line judgment unit 202 judges whether the received index and the held index match each other. The management line judgment unit 202 typically has only to determine beforehand the held index that is to be managed by the cache memory, and provide a circuit that is assertable when an access occurs in accordance with the held index.

Also, when judging that the access is to the management target line, the management line judgment unit 202 notifies the count management unit 203 that the access is to the management target line. To the contrary, when the management line judgment unit 202 judges that the access is not to the management target line, the management line judgment unit 202 notifies the count management unit 203 and the line size determination unit 204 that the access is not to the management target line.

The hit/miss judgment unit 205 judges whether the data required by the processor is present (hit) or not (miss) as the cache data. When receiving the tag and the index from the address analyzing unit 201, the hit/miss judgment unit 205 passes the index to the cache data storage unit 207. Next, the hit/miss judgment unit 205 receives, from the cache data storage unit 207, a tag of the cache data that corresponds to the index passed to the cache data storage unit 207. The hit/miss judgment unit 205 compares the tag received from the address analyzing unit 201 with the tag received by inquiring of the cache data storage unit 207.

As a result of the comparison, if the extracted tag and the received tag match each other, the hit/miss judgment unit 205 judges a hit, receives data of a line corresponding to the extracted tag from the cache data storage unit 207, and passes the data to the processor 1. Also, the hit/miss judgment unit 205 notifies the count management unit 203 and the line size determination unit 204 of the hit. To the contrary, if the extracted tag and the received tag do not match each other, the hit/miss judgment unit 205 judges a miss and notifies the count management unit 203 and the line size determination unit 204 of the miss.

Also, regardless of the judgment result, the hit/miss judgment unit 205 passes the tag and the index received from the address analyzing unit 201 to the count management unit 203 and the line size determination unit 204.

The count management unit 203 stores therein and manages the number of accesses (the number of reads and the number of reads writes) to the predetermined part of all the lines in the cache memory. A method for determining the management target line will be described later.

When receiving, from the management line judgment unit 202, the notification that the management target line is accessed, the count management unit 203 identifies the management target line relating to the index received from the hit/miss judgment unit 205.

To the count management unit 203, a signal line is connected so as to show a notification when a read request or a write request issued by the processor 1 is received. The count management unit 203 updates the number of reads or the number of writes depending on the read request or the write request notified via the signal line and whether the notification from the hit/miss judgment unit 205 indicates the hit or the miss.

Also, in the case of receiving the notification of the miss, the count management unit 203 passes the tag and the index received from the address analyzing unit 201 to the refill unit 206. Also, the count management unit 203 passes a line size to the refill unit 206.

Also, in the case of receiving the notification of the miss, if the line has been judged not to be the management target line, the count management unit 203 identifies an index of an alternative line that is to be the management target line, relating to a value of the index of the line that is not the management target line. The count management unit 203 then notifies the line size determination unit 204 of the identified index.

The line size determination unit 204 references the number of reads/writes of the index notified by the count management unit 203, and to determine whether a refill size is one line or plural lines (for example, four lines).

This process for determining the refill size is performed when the line size determination unit 204 receives the notification that the index does not correspond to the management target line from the management line judgment unit 202 and the notification of the miss from the hit/miss judgment unit 205.

The detail of the process is as follows. The line size determination unit 204 receives the index of the management target line from the count management unit 203. Next, the line size determination unit 204 receives tags corresponding to all of the received indexes, from the cache data storage unit 207. Also, the line size determination unit 204 receives the number of reads/writes each corresponding to all the indexes received from the count management unit 203.

When all the received tags completely match one another, the numbers of reads match completely one another, and the numbers of writes completely match one another, the line size determination unit 204 determines the refill size as four lines, that is, a large size. Also, if any of them do not match one another, the line size determination unit 204 determines the refill size as one line, that is, a normal size. The line size determination unit 204 then notifies the refill unit 206 of the determined line size and an address of data to be refilled.

The refill unit 206 receives the address at which the data to be refilled is present and the refill size, from the count management unit 203 or the line size determination unit 204. The refill unit 206 then reads data that is present at the received address, using the received line size, from the external memory 231.

After reading, the refill unit 206 transfers the read data, the address of the data, and the size of the data to the cache data storage unit 207. Besides, instead of the address and the size of the data above, the refill unit 206 may transfer, to the cache data storage unit 207, the tag and the index that are to be refilled, which is received from the count management unit 203 or the line size determination unit 204.

The cache data storage unit 207 stores therein and manages the cache data. The cache data storage unit 207 manages the stored data in units of lines, and each line can be uniquely identified relating to the index. Also, the cache data storage unit 207 manages the lines by associating each line with the tag that shows at which address the data of each line is present in the external memory 231.

The cache data storage unit 207 receives the index from the hit/miss judgment unit 205, and then identifies a line relating to the index. After that, the cache data storage unit 207 returns, to the hit/miss judgment unit 205, the tag that is managed by being corresponded to the line.

When receiving the size of the data from the refill unit 206, the cache data storage unit 207 recognizes how many lines the data has based on the managed line size. Next, when receiving the address of the data from the refill unit 206, the cache data storage unit 207 passes the address of the data to the address analyzing unit 201, and receives the tag and the index from the address analyzing unit 201. The cache data storage unit 207 then identifies a line relating to the received index, and manages the data received from the refill unit 206 as the data of the identified line. Also, the cache data storage unit 207 manages the tag received from the address analyzing unit 201 as the tag that corresponds to the identified line. Besides, instead of receiving the address and the size of the data from the refill unit 206, the cache data storage unit 207 may receive the tag and the index corresponding to the line that is to be refilled to update the cache data.

In the case where the data received from the refill unit 206 includes a plurality of lines, the cache data storage unit 207 manages the data corresponding to the identified line and lines that follow the identified line. The cache data storage unit 207 manages a plurality of tags received from the address analyzing unit 201 as tags corresponding to the identified line and the lines that follow the identified line. Regarding the data of all the lines received from the refill unit 206, the cache data storage unit 207 performs such an operation described above and manages the cache data.

Figure 3:
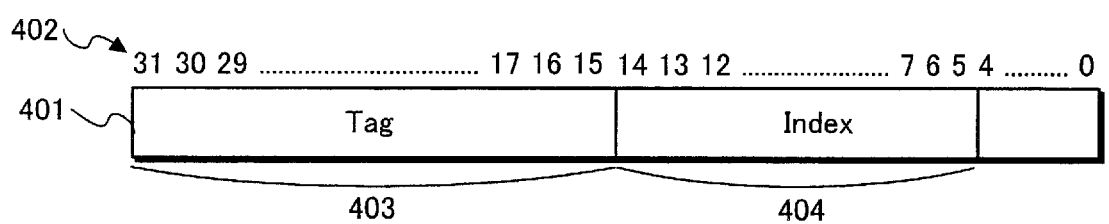
FIG. 3 shows an example of address information received by an address analyzing unit.

Next, the following explains an example of the address passed to the address analyzing unit 201 by the processor 1. FIG. 3 shows, as an example, an address 401 that is composed of 32 bits. A sequence of numerical values 402 that are composed of values from 0 to 31 that show bits that constitute the address 401, from the least significant $0^{th}$ bit to the $31^{st}$ bit (the $31^{st}$ bit is the most significant bit) respectively, for convenience sake.

The address 401 includes an upper address 403 composed of the $15^{th}$ bit to the $31^{st}$ bit, and a lower address 404 composed of the $5^{th}$ bit to the $14^{th}$ bit.

When receiving the address 401, the address analyzing unit 201 cuts out the upper address 403 as the tag and the lower address 404 as the index from the address 401, based on the line size and a cache block size.

FIG. 3 shows, as an example, the case where the line size is 32 bytes and the cache block size is 32 KB. Such a line size and a cache block size are just examples, and are variable according to a configuration of the cache memory.

Next, the following explains an example of the cache data managed by the cache data storage unit 207.

According to an example shown in FIG. 4, the cache data storage unit 207 manages "cache data" 207c, an "index" 207a that shows a line of the data, and a "tag" 207b that shows which address the data has in the external memory 231.

Figure 5:
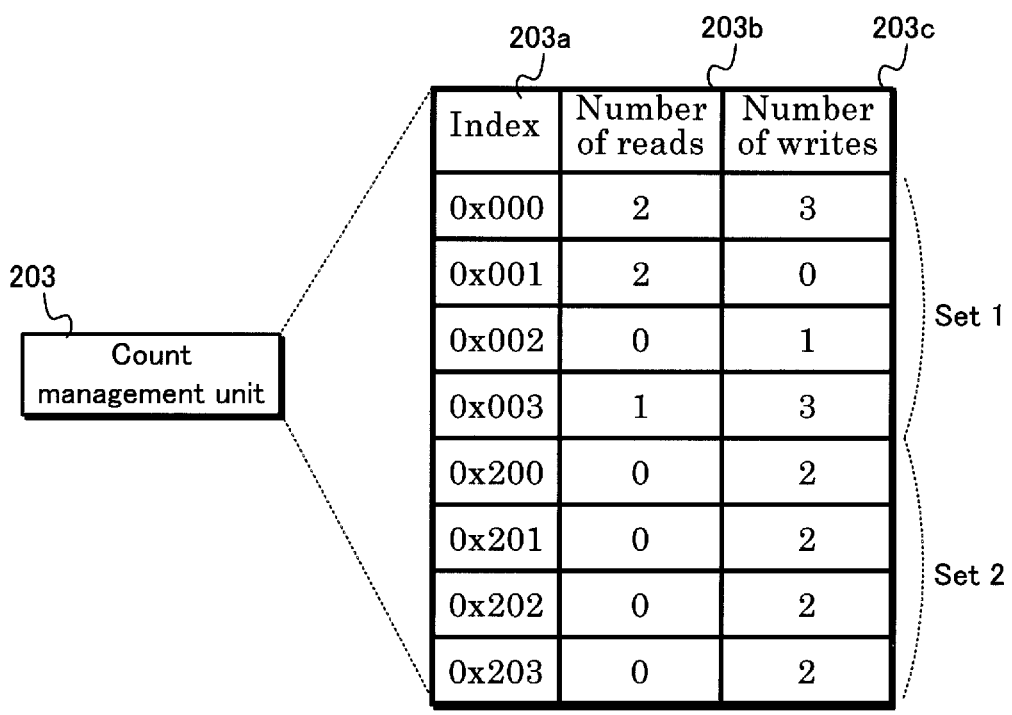
FIG. 5 shows an example of information managed by a read/write count management unit.

As described above, a part of the line (index) of the data stored in the cache data storage unit 207 is a management target line that is to be managed by the count management unit 203. FIG. 5 shows a specific example.

The count management unit 203 includes an "index" 203a that shows the management target line, a "number of reads" 203b and a "number of writes" 203c that each correspond to the index.

According to the example shown in FIG. 5, management targets are a "set 1" composed of four lines of the indexes from 0x000 to 0x003 and a "set 2" composed of four lines of the indexes from 0x200 to 0x203. As described above, a top index of each set, 0x000 or 0x200, corresponds to a value that is at top of each page used by a program.

<Operation>

Hereinafter, an operation of the cache memory device according to the embodiment is explained.

Figure 6:
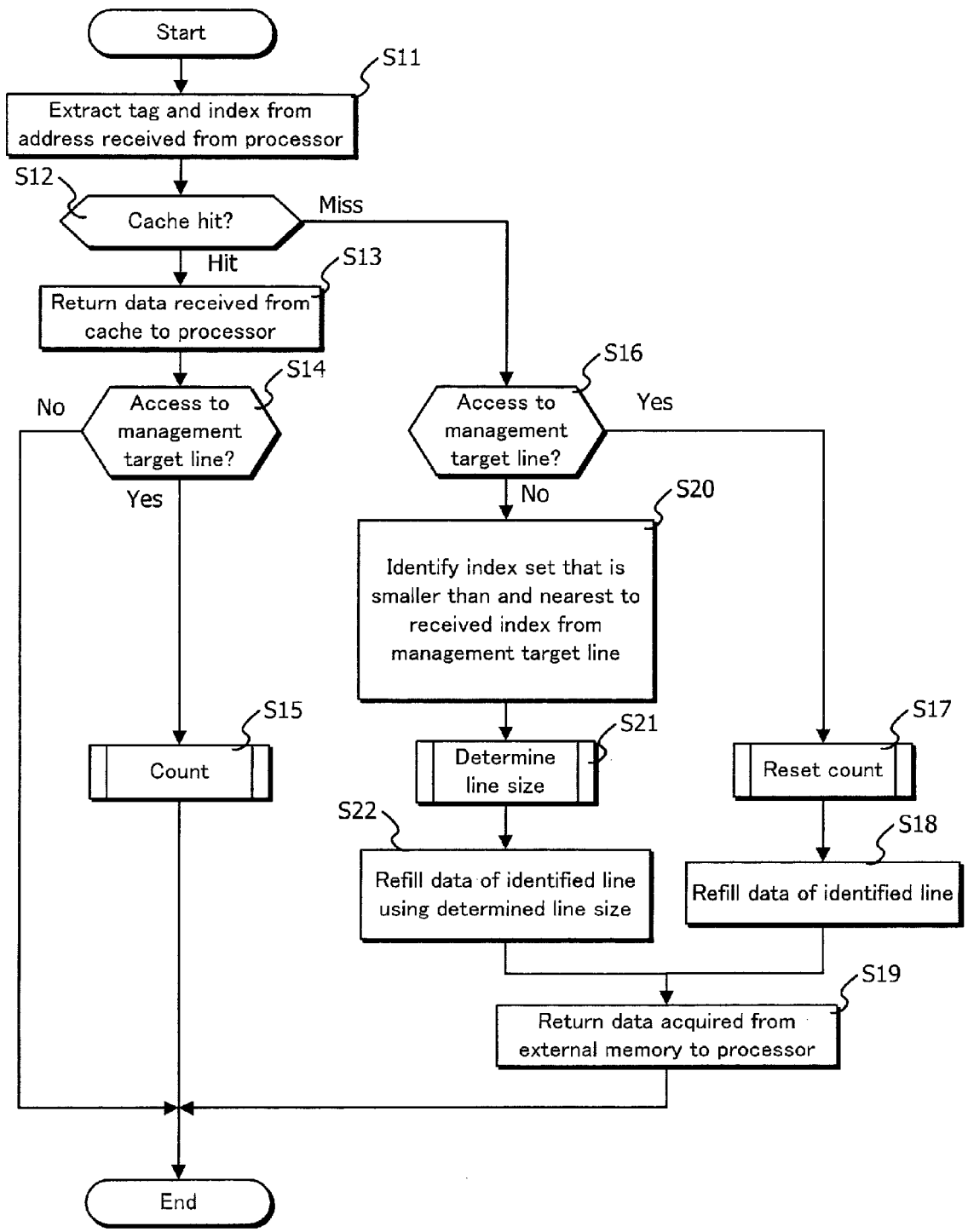
FIG. 6 is a flowchart showing operations of the cache memory device.

As FIG. 6 shows, the address analyzing unit 201 firstly receives an address from the processor 1, and extracts a tag and an index from the address (S11).

Next, when receiving the tag and the index from the address analyzing unit 201, the hit/miss judgment unit 205 judges whether a hit or a miss by inquiring of the cache data storage unit 207 (S12). The hit/miss judgment unit 205 receives the tag of the cache data corresponding to the index, from the cache data storage unit 207, and compares the received tag with the tag extracted by the address analyzing unit 201. If the extracted tag and the received tag match each other, the hit/miss judgment unit 205 judges a hit (S12: Hit). If the extracted tag and the received tag do not match each other, the hit/miss judgment unit 205 judges a miss (S12: Miss).

In the case of the hit (S12: Hit), the hit/miss judgment unit 205 receives the cache data corresponding to the address extracted in Step S11 from the cache data storage unit 207, and returns the cache data to the processor 1 (S13).

The management line judgment unit 202 then judges whether the index that is included in the address extracted in Step S11 is the index of the management target line (S14).

If the index is the index of the management target line (S14: Yes), the processing flow proceeds to a counting process (S15 in FIG. 7). If the index does not correspond to the index of the management target line (S14: No), the process ends.

Figure 7:
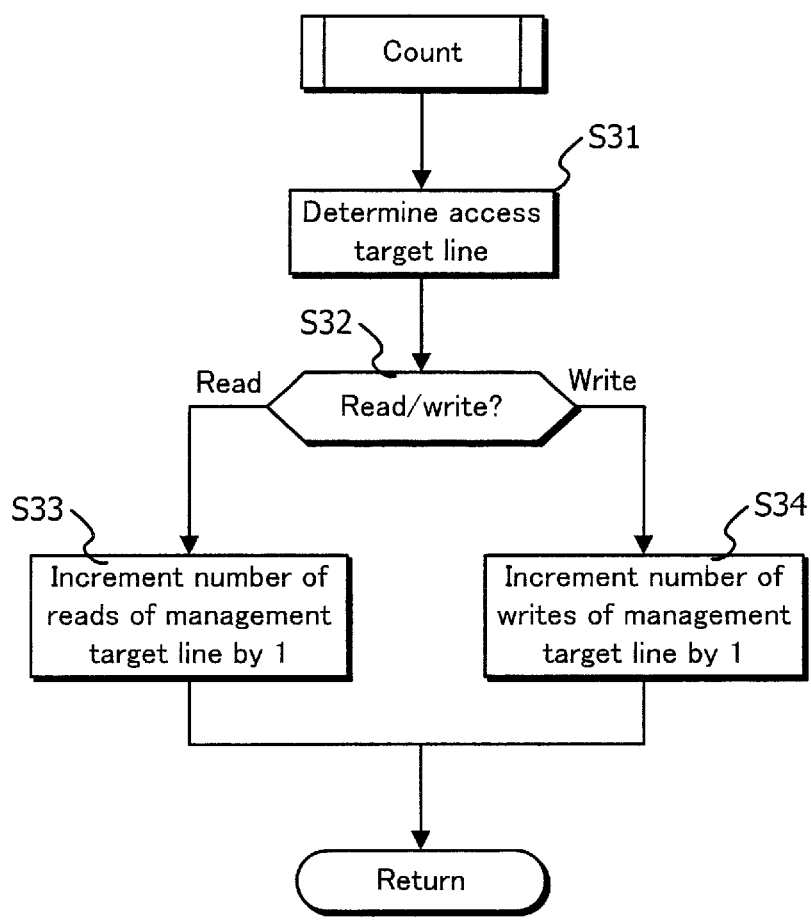
FIG. 7 is a flowchart showing operations of counting.

As FIG. 7 shows, according to the counting process, the count management unit 203 identifies an access target line (S31). If an access request is a read request (S32: read), the management target line increments the number of reads by one (S33).

If the access request is a write request (S32: Write), the count management unit 203 increments the number of writes of the management target line by one (S34).

As a specific example, in the case where the access target line is "0x000" and the access is a read request, the count management unit 203 increments by one the number of reads, two (see FIG. 5), of the index "0x000" so as to update the number of reads to three. Also, if the access target line is "0x000" and the access is a write request, the count management unit 203 increments by one the number of reads, zero (see FIG. 5), of the index "0x001" to update the number of reads to one.

Thus, when the hit/miss judgment unit 205 judges the hit (S12: Hit) and the management target line is accessed (S14: Yes), the count management unit 203 counts the number of reads and the number of writes of the corresponding management target line (S31-34).

When the hit/miss judgment unit 205 judges the miss (S12: Miss), the management line judgment unit 202 judges whether the index extracted from the address in Step S11 is the index of the management target line (S16).

If the index is the index of the management target line (S16: Yes), the processing flow proceeds a count reset process (S17 in FIG. 8).

Figure 8:
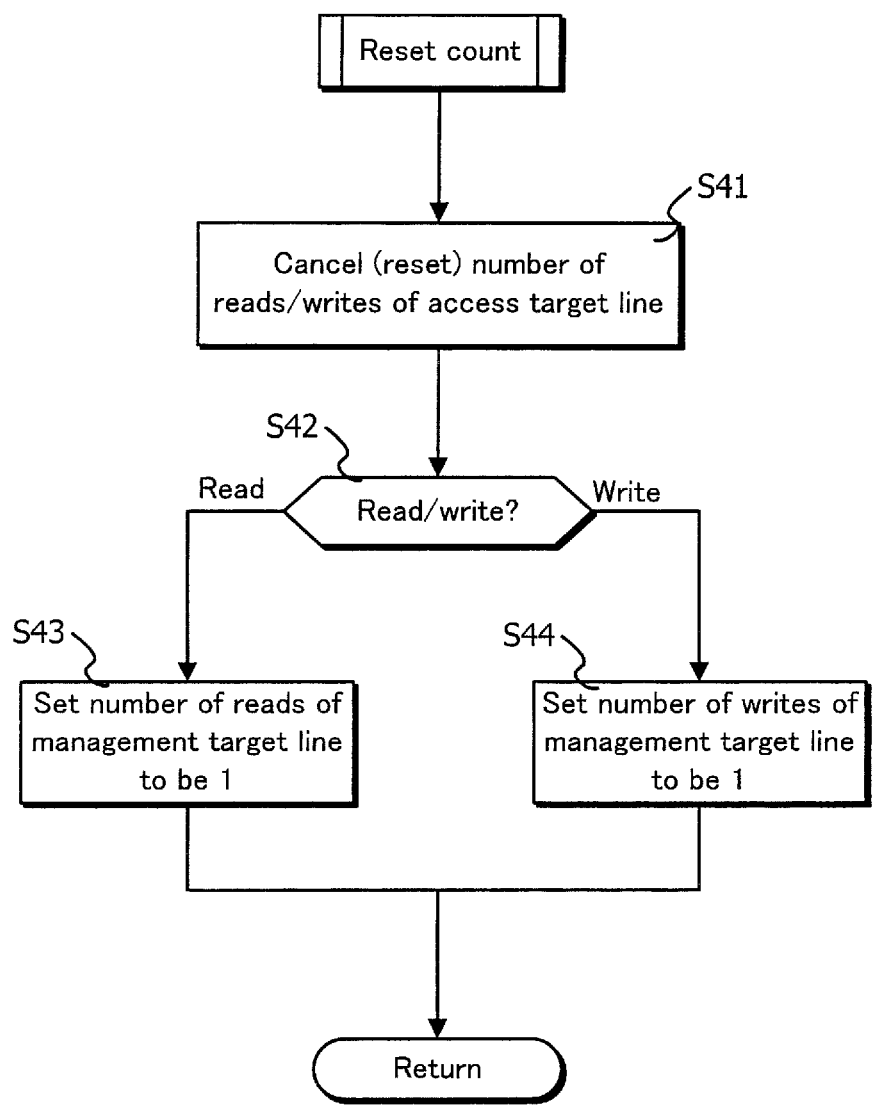
FIG. 8 is a flowchart showing operations of resetting the count.

As FIG. 8 shows, according to the count reset process, the count management unit 203 cancels (resets) the number of reads/writes of the access target line (S41). If the access is the read request (S42: Read), the number of reads of the management target line is set to be one (S43).

To the contrary, if the access request is the write request (S42: Write), the count management unit 203 sets the number of writes of the management target line to be one (S44).

As a specific example, if the access target line is "0x000" and the access is the read request, the count management unit 203 resets both of the number of reads, two, and the number of writes, three (see FIG. 5), of the index of the management target line to be zero, and then redefines the number of reads to be one.

After such a count reset process, the refill unit 206 receives the data of a corresponding line (line corresponding to the index extracted from the address in Step S11) from the external memory 231, and refills the cache data in the cache data storage unit 207 (S19).

Concretely, the refill unit 206 reads, from the external memory 231, the data corresponding to the refill target address received from the count management unit 203. The refill unit 206 then passes the read data to the cache data storage unit 207 so as to be stored as the cache data. Next, the refill unit 206 returns the read data from the external memory 231 to the processor 1.

If the index is not the index of the management target line (S16: No), the management line judgment unit 202 notifies the count management unit 203 of the judgment result. When receiving the notification, the count management unit 203 identifies an index set including the indexes that are smaller than and nearest to the index received in Step S11 among the management target lines managed by the count management unit 203 per se. For example, if the index extracted from the address in Step S11 is "0x280" (FIG. 4), a set 2 is identified (S20), since the set 2 is composed of indexes (FIG. 5: set composed of four lines, "0x200"-"0x203") that are smaller than and nearest to the index of "0x280".

Subsequently, the processing flow proceeds a line size determination process (S21, FIG. 8).

According to the line size determination process, when receiving information showing the identified set from the management line judgment unit 202, the line size determination unit 204 acquires the number of reads/writes that corresponds to the identified set from the count management unit 203. Also, the line size determination unit 204 acquires the tags of the management target lines that belong to the identified set from the cache data storage unit 207 (S51).

The line size determination unit 204 then judges whether all of the acquired numbers of reads of the management target lines completely match one another and all of the acquired numbers of writes of the management target lines completely match one another (S52). For example, if the index set is identified as the set 2, all of the numbers of reads of the four lines composed of "0x200"-"0x203" that belong to the set 2 are each zero, and all of the numbers of writes are each two. That is, the numbers of reads completely match one another and the numbers of writes completely match one another (see FIG. 5). Accordingly, result of the judgment is affirmative. To the contrary, if the index set is specified as the set 1, the numbers of reads of the four lines of "0x000"-"0x003" that belong to the set 1 are two, two, zero and one. That is, each of the numbers of reads is irregular (see FIG. 5). Accordingly, the result of the judgment is negative.

If the result of the judgment is affirmative (S52: Yes), subsequently, the line size determination unit 204 judges whether all of the acquired tags of the management target lines completely match one another (S53). For example, if the index set is specified as the set 2, all of the tags of the four lines, "0x200"-"0x203" that belong to the set 2 match "0x02000" (see FIG. 4). Accordingly, the result of the judgment is affirmative. To the contrary, if the index set is identified as the set 1, the tags of four lines, "0x000"-"0x003" that belong to the set 1 are "0x01c80", "0x01c80", "0x10000" and "0x00040". That is, only two of them match each other and the situation is not a perfect match. Accordingly, the result of the judgment is negative.

In the case where all of the acquired numbers of reads of the management target lines match completely one another and all of the acquired numbers of writes of the management target lines completely match one another (S52: Yes), and all of the tags of the acquired management target lines completely match one another (S53: Yes), the line size determination unit 204 determines the refill size to be a size that is equal to four lines (S54).

If either of the judgments according to Steps S52 and S53 is not fulfilled (S52: No, or S53: No), the line size determination unit 204 determines a normal refill size to be a size that is equal to one line.

After such a line size determination process, the refill unit 206 acquired the data of a corresponding line (line corresponding to the index extracted from the address in Step S11) from the external memory 231, and refills the cache data in the cache data storage unit 207 (S19).

Especially, if the refill size is the size that is equal to four lines (S54), the refill unit 206 refills not only the corresponding line but also three lines whose indexes follow the index of the corresponding line. For example, if the index extracted from the address in Step S11 is "0x280", the refill unit 206 considers as a refill target not only a line "0x280", but also subsequent three lines "0x281"-"0x283". That is, the refill target is four lines in total.

Generally, a program uses and manages a memory in units of pages. Accordingly, if the numbers of reads of indexes corresponding to the same page completely match one another, and the numbers of writes of the indexes corresponding to the same page completely match one another, it can be presumed that the program performs successive (sequential) operations. Accordingly, under the condition that the numbers of reads completely match one another and the numbers of writes completely match one another, if the refill size is set to be larger than usual, it can be expected that the refilled data is more likely to be utilized (hit rate increases) later.

As the present embodiment shows, regarding the management target lines "0x200"-"0x203", the numbers of reads completely match one another and the numbers of writes completely match one another (see FIG. 5), and accordingly it is highly possible that the program performs successive operations. As a result, by refilling not only the line "0x280" but also the lines "0x281"-"0x283", the lines "0x281"-"0x283" are accessed (the program references "0x281"-"0x283") after the refill, and accordingly a cache hit rate can be increased.

Also, regarding indexes corresponding to the same page, indexes at top of the page show most significantly a performance of the program. Therefore, by setting a part at top of the page such as "0x200"-"0x203" to be the management target line and checking a match of the numbers of reads/writes of the part, it is possible to determine an appropriate refill size that reflects correctly the performance of the program.

<Supplement 1>

While the present embodiment has been described above, the present invention is not limited thereto, and feasible in various forms for achieving a purpose of the present invention and a purpose related thereto or attendant thereon. For example, the following may be possible.

Figure 9:
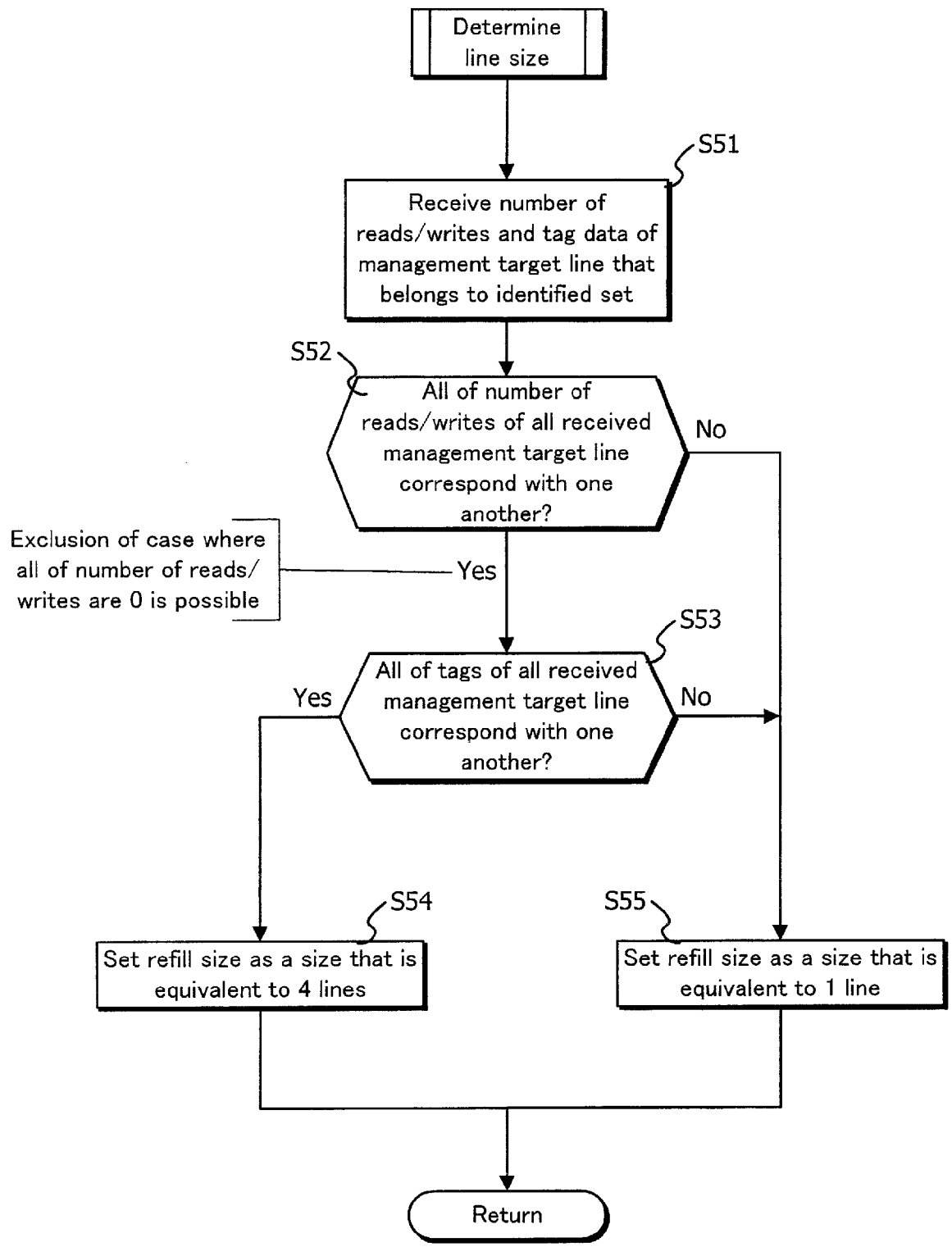
FIG. 9 is a flowchart showing operations of determining a line size.

(1) According to an example shown in FIG. 9, a match of the tags is judged after a match of the numbers of reads/writes is judged. However, such an order is not limited thereto, and may be reversed (Step S52 may follow Step S53).

Also, a process of Step S53 is performed for judging the match of the tags each indicating at which address data corresponding to cache data is stored in the external memory 231. This judgment contributes to remove an inappropriate match of the tags whose numbers of reads/writes coincidentally match one another. That is, it is possible, by the judgment, to remove the number of reads/writes that do not correctly reflect the performance of the program and accordingly contribute to determine a more appropriate refill size. However, the process of Step S53 is not necessary and it is possible to skip Step S53.

(2) Though a detail has not been described in the embodiment, the cache data storage unit 207 may manage, in units of lines, a validation tag showing that the data is valid or invalid, or a dirty tag that ensures consistency of the data, like a general cache technology.

Also, especially when the validation tag is managed, the hit/miss judgment unit 205 may judge a hit on condition that the validation tag shows that the data is valid, in addition to the match of the tags.

(3) According to the embodiment, when the refill size is set to be large, the line size determination unit 204 determines the number of the lines to be refilled as four (FIG. 9: S54) that is the same as the number of the lines included in one line set of the management target line. However, the number of the lines to be refilled is not limited thereto. For example, two or eight may be possible.

In sum, if a refill size A, which is a size in the case where the numbers of reads/writes of the management target lines completely match one another, is relatively larger than a refill size B, which is a size in the case where the numbers of reads and the numbers of writes do not match one another (A>B), the present invention can be helpful for optimization of the refill size.

(4) According to the embodiment, the RAM 22 is exemplified as the external memory 231. However, requirement of the external memory 231 is not limited to the RAM 22. If a memory is lower than the cache memory device 10 in memory hierarchy, the memory is sufficient. For example, the storage medium 31 which is read by the HDD 25 or the read unit 32 may be used as the external memory 31.

(5) Here is an explanation of how to set the management target line in the count management unit 203. Like the embodiment, a plurality of line set are composed of a plurality of lines whose index values are continuous values, and each of line sets is separated at a fixed interval. The fixed interval is favorably set in accordance with an interval of a unit of memory (management unit of the program in the memory) used by the program, and each line set is favorably set to be at top of the unit of memory. Besides, although it is best to set each line set to be at top of the unit of memory in order to estimate accurately the operation of the program, each line set may be positioned in the middle of the unit of memory in some cases.

Figure 10:
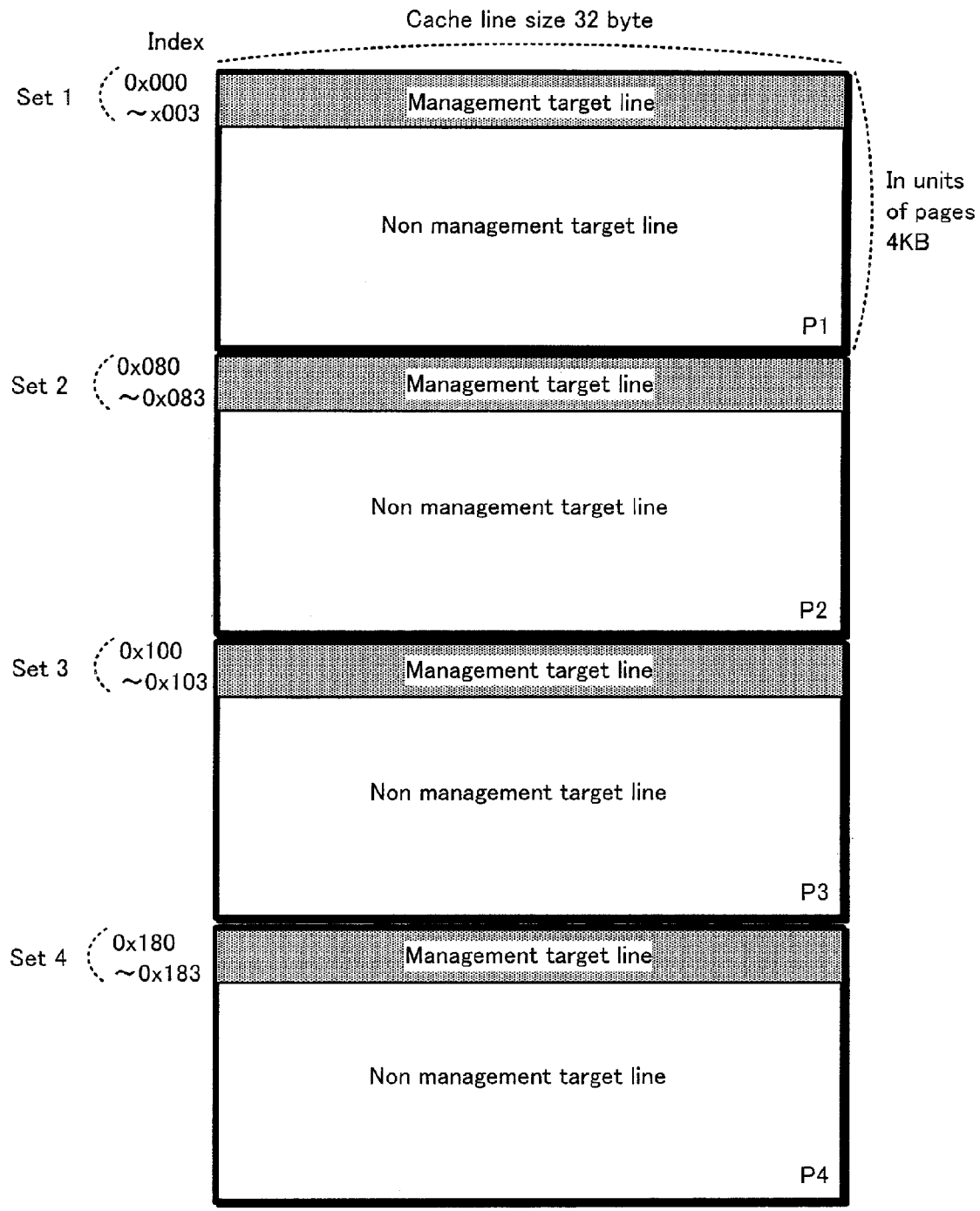
FIG. 10 explains an example for setting a management target line.

A specific example of the management target line is further shown in FIG. 10. As FIG. 10 shows, in the case where the unit of memory used by the program is 4 KB and a cache line size is 32 B, the line set is set at an interval of the index 0x80 (128). It is then thought that each line set includes sequential four lines whose top index is such as 0x000, 0x080, and 0x100.

In addition, the number of lines for being set has only to be plural (more than two), and may be, for example, eight.

(6) Regarding "Yes" of Step S52 shown in FIG. 9, if all of the numbers of reads are each zero and all of the numbers of writes are each zero, such a case may be excluded. This is because the case where all of the numbers of reads and all of the numbers of writes are each zero may not be appropriate as materials for estimating the performance of the program.

(7) According to the embodiment, the information processing device 1000 is explained as a PC, but not limited thereto. The information processing device 1000 may be a portable communication terminal such as a PDA (Personal Digital Assistance) or a mobile telephone. Also, the information processing device 1000 itself may be used by a user, or may be built in various electronic devices.

(8) According to the embodiment, the processor 1 is explained as a CPU, but not limited thereto. The processor 1 may be a processor for media processing or graphics processing, or a DSP (Digital Signal Processor). Also, the processor may be composed of a single processor or a plurality of processors.

(9) Note that each of function blocks shown in FIG. 2 is typically realized as a cache memory that exists between a processor and an external memory, but may be realized as an LSI that is an integrated circuit. These function blocks may be separately integrated into one chip, or integrated into one chip including a part or all of the functional blocks. Here, the integrated circuit is called an LSI, but might be called a system LSI, a super LSI, and an ultra LSI, depending on the integration degree. Also, a method of forming integrated circuits is not limited to LSIs, and may be realized using a dedicated circuit or a general-purpose processor. Furthermore, it is possible to form integrated circuits with use of an FPGA (Field Programmable Gate Array) programmable after manufacturing LSIs or a reconfigurable processor in which connection and setting of the circuit cell inside an LSI can be reconfigured. Furthermore, when a new integrated circuit technology that replaces the LSIs becomes available as a result of progress in semiconductor technology or semiconductor-derived technology, the functional blocks may be integrated using such technologies.

A control program composed of program code which is for a processor of various information processing devices and various circuits connected with the processor so as to execute operations or the like shown the embodiments can be stored in storage media, or distributed via various networks. The storage media may be IC cards, HDDs, optical discs, flexible disks, ROMs or the like. The distributed control program is stored in a memory or the like which is readable by the processor, and the program is executed by the processor. As a result, each function shown in the embodiments is realized.

(11) The embodiment and specific values of specs (line size, cache block size or the like) described in the supplement 1 are just examples, and are variable in accordance with a configuration of a cache memory.

<Supplement 2>

The present embodiment includes a following aspect.

(1) A cache memory device of the present embodiment comprises a storage unit operable to store cache data therein; an address extraction unit operable, on receipt of an access request that includes specification of an address, to extract a tag and an index from the address; a hit/miss judgment unit operable to judge, with respect to the cache data, a hit or a miss based on the tag and the index extracted by the address extraction unit; a management unit operable to manage, regarding a plurality of line sets that each consist of a plurality of lines whose indexes are sequential, a number of accesses to each line; a count unit operable, when the index extracted by the address extraction unit indicates an index corresponding to one of the plurality of lines and the hit/miss judgment unit judges a hit relating to the extracted index, to increment by one the number of accesses to the line corresponding to the extracted index; an identification unit operable, when the extracted index does not indicate an index corresponding to one of the plurality of lines and the hit/miss judgment unit judges a miss relating to the extracted index, to identify a line set including the line represented by the extracted index among the plurality of lines; a determination unit operable, when the numbers of accesses to all the lines that constitute the line set identified by the identification unit do not match one another, to determine a refill size as a first refill size, the refill size being a size of cache data that is to be refilled, or when the numbers of accesses to all the lines that constitute the identified line set completely match one another, to determine the refill size as a second refill size that is larger than the first refill size; and a refill unit operable to refill the cache data based on the refill size determined by the determination unit.

(2) Values of the indexes that constitute the plurality of lines may be continuous values, and the identification unit may identify the line set that includes the line corresponding to a predetermined index that has a value smaller than and nearest to a value of the index extracted by the address extraction unit.

(3) Cache data to be stored in the storage unit may be data stored in a main memory, and managed in units of pages that is used by a program for reading and writing, the plurality of line sets may correspond one-to-one to the pages of the main memory, and a top index of each line set may correspond to a value that is at top of each page of the main memory.

(4) The storage unit stores therein the cache data in units of lines, in relation to tags that indicate where data corresponding to the cache data is stored in the main memory, the extracted index designates the line corresponding thereto in the storage unit, and the determination unit may acquires, from the storage unit, all the tags one-to-one corresponding to the lines that constitute the identified line set, when the numbers of accesses to all the lines that constitute the identified line set completely match one another and all the acquired tags do not match one another, the determination unit may determine the refill size as the first refill size, when the numbers of accesses to all the lines that constitute the identified line set completely match one another and all the acquired tags completely match one another, the determination unit may determine the refill size as the second refill size.

This configuration can estimate performance of the program more accurately, and contribute to determination of an appropriate refill size.

(5) The access request may be a read request or a write request, the number of accesses managed by the management unit may include a number of reads and a number of writes, when the access request received by the address extraction unit is the read request and the hit/miss judgment unit judges a hit in accordance with the read request, the count unit increments the number of reads of the extracted index by one, and when the access request received by the address extraction unit is the write request and the hit/miss judgment unit judges a hit in accordance with the write request, the count unit increments the number of writes of the extracted index by one, and when numbers of reads of the lines that constitute the identified line set match completely one another and numbers of writes of the lines that constitute the identified line set completely match one another, the determination unit determines the refill size as the second refill size, and when the numbers of reads of the lines that constitute the identified line set do not match one another or the numbers of writes of the lines that constitute the identified line set do not match one another, the determination unit determines the refill size as the first refill size.

(6) When the index extracted by the address extraction unit indicates an index corresponding to one of the plurality of lines and the hit/miss judgment unit judges a miss relating to the extracted index, the count unit may reset the number of accesses that includes the number of reads and the number of writes of the line corresponding to the index extracted from the address included in the access request, and then, increment by one the number of reads or the number of writes of the extracted index depending on whether the access request is the read request or the write request.

(7) The storage unit may store therein the cache data in units of lines, in relation to tags that indicate where data corresponding to the cache data is stored in the main memory, the extracted index may designate a line stored in the storage unit, and the hit/miss judgment unit may identify an index corresponding to the extracted index by the address extraction unit among data stored in the storage unit, and compare a tag related to the identified index with the tag extracted by the address extraction unit, and when the related tag and the extracted tag match each other, the hit/miss judgment unit may judge a hit, or when the related tag and the extracted tag do not match each other, the hit/miss judgment unit may judge a miss.

(8) A cache memory controlling method of the present embodiment comprises the steps of: storing cache data therein; on receipt of an access request that includes specification of an address, extracting a tag and an index from the address; judging, with respect to the cache data, a hit or a miss based on the tag and the index extracted by the address extraction unit; managing, regarding a plurality of line sets that each consist of a plurality of lines whose indexes are sequential, a number of accesses to each line; when the index extracted by the address extraction unit indicates an index corresponding to one of the plurality of lines and the hit/miss judgment unit judges a hit relating to the extracted index, incrementing by one the number of accesses to the line corresponding to the extracted index; when the extracted index does not indicate an index corresponding to one of the plurality of lines and the hit/miss judgment unit judges a miss relating to the extracted index, identifying a line set including the line represented by the extracted index among the plurality of lines; when the numbers of accesses to all the lines that constitute the line set identified by the identification unit do not match one another, determining a refill size as a first refill size, the refill size being a size of cache data that is to be refilled, or when the numbers of accesses to all the lines that constitute the identified line set completely match one another, determining the refill size as a second refill size that is larger than the first refill size; and refilling the cache data based on the refill size determined by the determination unit.

(9) A program of the present embodiment causes a cache memory device to perform cache memory control processing and comprises the steps of: storing cache data therein; on receipt of an access request that includes specification of an address, extracting a tag and an index from the address; judging, with respect to the cache data, a hit or a miss based on the tag and the index extracted by the address extraction unit; managing, regarding a plurality of line sets that each consist of a plurality of lines whose indexes are sequential, a number of accesses to each line; when the index extracted by the address extraction unit indicates an index corresponding to one of the plurality of lines and the hit/miss judgment unit judges a hit relating to the extracted index, incrementing by one the number of accesses to the line corresponding to the extracted index; when the extracted index does not indicate an index corresponding to one of the plurality of lines and the hit/miss judgment unit judges a miss relating to the extracted index, identifying a line set including the line represented by the extracted index among the plurality of lines; when the numbers of accesses to all the lines that constitute the line set identified by the identification unit do not match one another, determining a refill size as a first refill size, the refill size being a size of cache data that is to be refilled, or when the numbers of accesses to all the lines that constitute the identified line set completely match one another, determining the refill size as a second refill size that is larger than the first refill size; and refilling the cache data based on the refill size determined by the determination unit.

(10) An integrated circuit of the present invention comprises: a storage unit operable to store cache data therein; an address extraction unit operable, on receipt of an access request that includes specification of an address, to extract a tag and an index from the address; a hit/miss judgment unit operable to judge, with respect to the cache data, a hit or a miss based on the tag and the index extracted by the address extraction unit; a management unit operable to manage, regarding a plurality of line sets that each consist of a plurality of lines whose indexes are sequential, a number of accesses to each line; a count unit operable, when the index extracted by the address extraction unit indicates an index corresponding to one of the plurality of lines and the hit/miss judgment unit judges a hit relating to the extracted index, to increment by one the number of accesses to the line corresponding to the extracted index; an identification unit operable, when the extracted index does not indicate an index corresponding to one of the plurality of lines and the hit/miss judgment unit judges a miss relating to the extracted index, to identify a line set including the line represented by the extracted index among the plurality of lines; a determination unit operable, when the numbers of accesses to all the lines that constitute the line set identified by the identification unit do not match one another, to determine a refill size as a first refill size, the refill size being a size of cache data that is to be refilled, or when the numbers of accesses to all the lines that constitute the identified line set completely match one another, to determine the refill size as a second refill size that is larger than the first refill size; and a refill unit operable to refill the cache data based on the refill size determined by the determination unit.

INDUSTRIAL APPLICABILITY

The cache memory device of the present invention has a function for changing refill size immediately in accordance with an operation of a program, and is useful as an information processing device. Also, the cache memory device is useful in a device that has a computer such as an embedded device such as an information device, an AV device, a communication device, and a household electrical appliance.

REFERENCE SIGNS LIST 1, 11, 12, 13 processor
2 memory device
10 cache memory device
21 ROM
22 RAM
25 HDD 26, 35, 41, 46 interface (I/F)
31 storage medium
32 read unit
33 communication line
34 communication unit
40 input unit
45 display unit
50 bus line
51 timer circuit
55 interrupt controller
201 address analyzing unit (address extraction unit)
202 management line judgment unit
203 count management unit
204 line size determination unit
205 hit/miss judgment unit
206 refill unit
207 cache data storage unit
231 external memory

The invention claimed is:

1. A cache memory device comprising:
a storage unit operable to store cache data therein;
an address extraction unit operable, on receipt of an access request that includes specification of an address, to extract a tag and an index from the address;
a hit/miss judgment unit operable to judge, with respect to the cache data, a hit or a miss based on the tag and the index extracted by the address extraction unit;
a management unit operable to manage, regarding a plurality of line sets that each consist of a plurality of lines whose indexes are sequential, a number of accesses to each line;
a count unit operable, when the index extracted by the address extraction unit indicates an index corresponding to one of the plurality of lines and the hit/miss judgment unit judges a hit relating to the extracted index, to increment by one the number of accesses to the line corresponding to the extracted index;
an identification unit operable, when the extracted index does not indicate an index corresponding to one of the plurality of lines and the hit/miss judgment unit judges a miss relating to the extracted index, to identify a line set including the line represented by the extracted index among the plurality of lines;
a determination unit operable, when the numbers of accesses to all the lines that constitute the line set identified by the identification unit do not match one another, to determine a refill size as a first refill size, the refill size being a size of cache data that is to be refilled, or when the numbers of accesses to all the lines that constitute the identified line set completely match one another, to determine the refill size as a second refill size that is larger than the first refill size; and
a refill unit operable to refill the cache data based on the refill size determined by the determination unit.

2. The cache memory device of claim 1, wherein
values of the indexes that constitute the plurality of lines are continuous values, and
the identification unit identifies the line set that includes the line corresponding to a predetermined index that has a value smaller than and nearest to a value of the index extracted by the address extraction unit.

3. The cache memory device of claim 2, wherein
cache data to be stored in the storage unit is data stored in a main memory, and managed in units of pages that is used by a program for reading and writing,
the plurality of line sets correspond one-to-one to the pages of the main memory, and
a top index of each line set corresponds to a value that is at top of each page of the main memory.

4. The cache memory device of claim 1, wherein
the storage unit stores therein the cache data in units of lines, in relation to tags that indicate where data corresponding to the cache data is stored in the main memory,
the extracted index designates the line corresponding thereto in the storage unit, and
the determination unit acquires, from the storage unit, all the tags one-to-one corresponding to the lines that constitute the identified line set,
when the numbers of accesses to all the lines that constitute the identified line set completely match one another and all the acquired tags do not match one another, the determination unit determines the refill size as the first refill size,
when the numbers of accesses to all the lines that constitute the identified line set completely match one another and all the acquired tags completely match one another, the determination unit determines the refill size as the second refill size.

5. The cache memory device of claim 1, wherein
the access request is a read request or a write request,
the number of accesses managed by the management unit includes a number of reads and a number of writes,
when the access request received by the address extraction unit is the read request and the hit/miss judgment unit judges a hit in accordance with the read request, the count unit increments the number of reads of the extracted index by one, and
when the access request received by the address extraction unit is the write request and the hit/miss judgment unit judges a hit in accordance with the write request, the count unit increments the number of writes of the extracted index by one, and
when numbers of reads of the lines that constitute the identified line set match completely one another and numbers of writes of the lines that constitute the identified line set completely match one another, the determination unit determines the refill size as the second refill size, and
when the numbers of reads of the lines that constitute the identified line set do not match one another or the numbers of writes of the lines that constitute the identified line set do not match one another, the determination unit determines the refill size as the first refill size.

6. The cache memory device of claim 5, wherein
when the index extracted by the address extraction unit indicates an index corresponding to one of the plurality of lines and the hit/miss judgment unit judges a miss relating to the extracted index, the count unit resets the number of accesses that includes the number of reads and the number of writes of the line corresponding to the index extracted from the address included in the access request, and then, increments by one the number of reads or the number of writes of the extracted index depending on whether the access request is the read request or the write request.

7. The cache memory device of claim 1, wherein
the storage unit stores therein the cache data in units of lines, in relation to tags that indicate where data corresponding to the cache data is stored in the main memory,
the extracted index designates a line stored in the storage unit, and
the hit/miss judgment unit identifies an index corresponding to the extracted index by the address extraction unit among data stored in the storage unit, and compares a tag related to the identified index with the tag extracted by the address extraction unit, and when the related tag and the extracted tag match each other, the hit/miss judgment unit judges a hit, or when the related tag and the extracted tag do not match each other, the hit/miss judgment unit judges a miss.

8. A cache memory controlling method comprising the steps of:

storing cache data therein;

on receipt of an access request that includes specification of an address, extracting a tag and an index from the address;

judging, with respect to the cache data, a hit or a miss based on the tag and the index extracted by the address extraction unit;

managing, regarding a plurality of line sets that each consist of a plurality of lines whose indexes are sequential, a number of accesses to each line;

when the index extracted by the address extraction unit indicates an index corresponding to one of the plurality of lines and the hit/miss judgment unit judges a hit relating to the extracted index, incrementing by one the number of accesses to the line corresponding to the extracted index;

when the extracted index does not indicate an index corresponding to one of the plurality of lines and the hit/miss judgment unit judges a miss relating to the extracted index, identifying a line set including the line represented by the extracted index among the plurality of lines;

when the numbers of accesses to all the lines that constitute the line set identified by the identification unit do not match one another, determining a refill size as a first refill size, the refill size being a size of cache data that is to be refilled, or when the numbers of accesses to all the lines that constitute the identified line set completely match one another, determining the refill size as a second refill size that is larger than the first refill size; and refilling the cache data based on the refill size determined by the determination unit.

9. A program that causes a cache memory device to perform cache memory control processing, the cache memory control processing comprising the steps of:

storing cache data therein;

on receipt of an access request that includes specification of an address, extracting a tag and an index from the address;

judging, with respect to the cache data, a hit or a miss based on the tag and the index extracted by the address extraction unit;

managing, regarding a plurality of line sets that each consist of a plurality of lines whose indexes are sequential, a number of accesses to each line;

when the index extracted by the address extraction unit indicates an index corresponding to one of the plurality of lines and the hit/miss judgment unit judges a hit relating to the extracted index, incrementing by one the number of accesses to the line corresponding to the extracted index;

when the extracted index does not indicate an index corresponding to one of the plurality of lines and the hit/miss judgment unit judges a miss relating to the extracted index, identifying a line set including the line represented by the extracted index among the plurality of lines;

when the numbers of accesses to all the lines that constitute the line set identified by the identification unit do not match one another, determining a refill size as a first refill size, the refill size being a size of cache data that is to be refilled, or when the numbers of accesses to all the lines that constitute the identified line set completely match one another, determining the refill size as a second refill size that is larger than the first refill size; and refilling the cache data based on the refill size determined by the determination unit.

10. An integrated circuit comprising:

a storage unit operable to store cache data therein;

an address extraction unit operable, on receipt of an access request that includes specification of an address, to extract a tag and an index from the address;

a hit/miss judgment unit operable to judge, with respect to the cache data, a hit or a miss based on the tag and the index extracted by the address extraction unit;

a management unit operable to manage, regarding a plurality of line sets that each consist of a plurality of lines whose indexes are sequential, a number of accesses to each line;

a count unit operable, when the index extracted by the address extraction unit indicates an index corresponding to one of the plurality of lines and the hit/miss judgment unit judges a hit relating to the extracted index, to increment by one the number of accesses to the line corresponding to the extracted index;

an identification unit operable, when the extracted index does not indicate an index corresponding to one of the plurality of lines and the hit/miss judgment unit judges a miss relating to the extracted index, to identify a line set including the line represented by the extracted index among the plurality of lines;

a determination unit operable, when the numbers of accesses to all the lines that constitute the line set identified by the identification unit do not match one another, to determine a refill size as a first refill size, the refill size being a size of cache data that is to be refilled, or when the numbers of accesses to all the lines that constitute the identified line set completely match one another, to determine the refill size as a second refill size that is larger than the first refill size; and a refill unit operable to refill the cache data based on the refill size determined by the determination unit.

* * * * *